United States Patent
Forsman et al.

(10) Patent No.: US 12,238,813 B2
(45) Date of Patent: Feb. 25, 2025

(54) BEARER CONNECTION HANDLING OF A COMMUNICATIONS NETWORK

(71) Applicant: Telefonaktiebolaget LM Ericsson (publ), Stockholm (SE)

(72) Inventors: Thomas Forsman, Västra Frölunda (SE); Göran Jansson, Gothenburg (SE); Marko Jusufovic, Gothenburg (SE); Darja Linkova, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 615 days.

(21) Appl. No.: 17/278,411

(22) PCT Filed: Sep. 23, 2019

(86) PCT No.: PCT/SE2019/050905
§ 371 (c)(1),
(2) Date: Mar. 22, 2021

(87) PCT Pub. No.: WO2020/185134
PCT Pub. Date: Sep. 17, 2020

(65) Prior Publication Data
US 2021/0360737 A1 Nov. 18, 2021

Related U.S. Application Data

(60) Provisional application No. 62/815,460, filed on Mar. 8, 2019.

(51) Int. Cl.
*H04W 76/32* (2018.01)
*H04L 1/1867* (2023.01)
(52) U.S. Cl.
CPC .......... *H04W 76/32* (2018.02); *H04L 1/1896* (2013.01)

(58) Field of Classification Search
None
See application file for complete search history.

(56) References Cited

U.S. PATENT DOCUMENTS

2012/0250611 A1* 10/2012 Yang ............... H04W 76/30
370/328
2013/0272268 A1* 10/2013 Xu ................ H04W 76/36
370/331

(Continued)

FOREIGN PATENT DOCUMENTS

CN 101500222 A 8/2009
CN 101938850 A 1/2011

(Continued)

OTHER PUBLICATIONS

International Search Report and Written Opinion issued in International Application No. PCT/SE2019/0505905 dated Jan. 13, 2020 (11 pages).

(Continued)

*Primary Examiner* — Saumit Shah
(74) *Attorney, Agent, or Firm* — Rothwell, Figg, Ernst & Manbeck, P.C.

(57) ABSTRACT

The disclosure relates to a network management entity (ME) in a communications network (CN), the network management entity (ME) being configured to; receive (S10) a request message (REQm), transmitted by a network serving entity (SE), indicating deletion of a bearer connection for a user equipment (UE, 600), transmit (S40) a release message (RELm) towards a network entity (NE), receive (S50) a complete message (COMPm +IDU) transmitted by the network entity (NE), confirming that the user equipment (UE, 600) is released, and comprising information regarding data usage (IDU), and transmit (S60) a response message (RESPm +IDU) towards the network serving entity (SE), acknowledging deletion of the bearer connection of the user (Continued)

equipment (UE, 600), in response to receiving the complete message (COMPm +IDU). The disclosure also relates to methods performed in a network management entity (ME).

26 Claims, 7 Drawing Sheets

(56) References Cited

U.S. PATENT DOCUMENTS

| | | | |
|---|---|---|---|
| 2015/0029999 | A1 | 1/2015 | Horn et al. |
| 2016/0192239 | A1* | 6/2016 | Salvador ............ H04W 28/0268 370/331 |
| 2016/0205660 | A1 | 7/2016 | Ryu et al. |
| 2017/0303195 | A1* | 10/2017 | Kim ...................... H04W 76/38 |
| 2018/0110087 | A1 | 4/2018 | Cai et al. |
| 2018/0227723 | A1* | 8/2018 | Takahashi ......... H04M 15/8214 |
| 2018/0352448 | A1 | 12/2018 | Ryu et al. |
| 2018/0376445 | A1 | 12/2018 | Yoon et al. |
| 2019/0053135 | A1 | 2/2019 | Hahn et al. |
| 2019/0098684 | A1* | 3/2019 | Tamura ................... H04L 12/14 |
| 2019/0306780 | A1* | 10/2019 | Baek ..................... H04W 48/02 |
| 2020/0029199 | A1* | 1/2020 | Sen ..................... H04L 41/0895 |

FOREIGN PATENT DOCUMENTS

| | | |
|---|---|---|
| CN | 103731929 A | 4/2014 |
| EP | 2 299 770 A1 | 3/2011 |
| WO | 2017/183949 A1 | 10/2017 |

OTHER PUBLICATIONS

3GPP TS 36.413 V15.3.0 (Sep. 2018), 3rd Generation Partnership Project; Technical Specification Group Radio Access Network; Evolved Universal Terrestrial Radio Access Network; (E-UTRAN); S1 Application Protocol (S1AP) (Release 15), Sep. 2018 (383 pages).

3GPP TS 29.274 V15.5.0 (Sep. 2018), 3rd Generation Partnership Project; Technical Specification Group Core Network and Terminals; 3GPP Evolved Packet System (EPS); Evolved General Packet Radio Service (GPRS); Tunnelling Protocol for Control plane (GTPv2-C); Stage 3 (Release 15), Sep. 2018 (388 pages).

3GPP TS 23.401 V15.5.0 (Sep. 2018), 3rd Generation Partnership Project; Technical Specification Group Services and System Aspects; General Packet Radio Service (GPRS) enhancements for Evolved Universal Terrestrial Radio Access Network (E-UTRAN) access (Release 15), Sep. 2018 (410 pages).

LTE Mobility Management, CPI 1.23, Nov. 9, 2018 (1 page).

Ericsson, CPI 1.27, Mar. 13, 2019 (1 page).

3GPP TS 23.401 V16.1.0 (Dec. 2018), 3rd Generation Partnership Project; Technical Specification Group Services and 1 System Aspects; General Packet Radio Service (GPRS) enhancements for Evolved Universal Terrestrial Radio Access Network (E-UTRAN) access (Release16), Dec. 2018 (412 pages).

\* cited by examiner

BEARER CONNECTION HANDLING OF A COMMUNICATIONS NETWORK

CROSS REFERENCE TO RELATED APPLICATION(S)

This application is a 35 U.S.C. § 371 National Stage of International Patent Application No. PCT/SE2019/050905, filed on Sep. 23, 2019, which claims priority to U.S. provisional patent application No. 62/815,460, filed on Mar. 8, 2019. The above identified applications are incorporated by this reference.

TECHNICAL FIELD

The present disclosure relates to wireless communications networks and network entities of wireless communications networks in general, more particular to network entities performing bearer connection handling and methods of bearer connection handling.

BACKGROUND

In the Evolved 3$^{rd}$ Generation Partnership Project, 3GPP, Packet Switched Domain, also known as the Evolved Packet System, EPS, Internet Protocol, IP, connectivity in a communications network is provided to communication terminals, commonly referred to as User Equipment, UE, via radio base stations such as E-UTRAN Node Bs, eNodeBs. Smart phones, tablets, laptops, gaming consoles etc. are examples of such UEs. The eNodeBs communicate with the UEs over an air interface and form the Evolved Universal Terrestrial Radio Access Network, E-UTRAN. The E-UTRAN connects the UEs to a core network, generally referred to as Evolved Packet Core, EPC. Together with the E-UTRAN the EPC forms the EPS. The EPC in turn connects UEs, via the E-UTRAN to Packet Data Networks, PDNs. PDNs may be defined as external networks that provides data services, such as e.g. internet service or IMS, IP Multimedia Subsystem, services. Thus, the EPS network enables a PDN connection, providing connectivity between a UE a PDN, via the E-UTRAN and the EPC, to be formed. One UE may have multiple PDN connections, thus be operatively connected to multiple PDNs. The communications network may also be operatively connected to other Radio Access Technologies, RATs, such as e.g. to what generally is referred to as 5G networks, Fifth generation of telecommunication technology networks, also referred to as New Radio, NR, networks. Other RATs are e.g. WiFi and Bluetooth.

The eNodeBs are operatively connected to a Mobility Management Entity, MME, and to a Serving Gateway, SGW, of the EPC, in turn operatively connected to a Packet Data Network Gateway, PGW. The PGW is operatively connected to a Policy and Charging Rules Function, PCRF. The PGW provides connectivity for the UEs to external PDNs by being the point of exit and entry of traffic for the UE with respect to the PDNs. A UE may have simultaneous connectivity with more than one PGW for accessing multiple PDNs. An UE, an SGW, a PGW, eNodeBs and a PCRF are all examples of entities of the communications network.

Connectivity between the various entities of a communications network, which also may be referred to as nodes, may be provided by bearer connections. A bearer connection may be defined as being a temporarily set up data tunnel between at least two entities of the communications network, or as a payload tunnel between at least two entities through which data can be transferred. Bearer connections may be of default bearer connection type or of dedicated bearer connection type. Default bearer connections provide the IP connectivity and are set up when a connection between respective entities is established. A dedicated bearer connection is set up between respective entities for delivering, or providing, a specific service. When the default bearer connection between two entities is terminated, independently of if that PDN connection currently also comprises a number of active dedicated bearer connections, all bearer connections of this PDN connection are deleted.

Bearer deactivation procedure is disclosed in 3GPP TS 23.401, V16.1.0.

SUMMARY

An object of the disclosure is to mitigate problems relating to lost usage data information by providing methods, and network management entities configured for performing such methods, addressing at least this issue.

Usage data reports due to utilization of Secondary Radio Access Technologies, Secondary RATs, are generally referred to as Secondary RAT Usage Data Reports. Such usage data may e.g. refer to New Radio, NR, data usage over a New Radio network, using gNodeBs, or data usage of the unlicensed spectrum radio communications network. The Secondary RAT Data Usage Reports may e.g. comprise information disclosing data volume usage over a defined time-period. For the exemplary embodiment relating to NR, New Radio, the NR usage data reports are transmitted by a NR network node, such as e.g. a next Generation Node B, gNodeB, to an E-UTRAN node B, eNodeB, which in turn transmits the information regarding NR data usage to an MME. This is done within Mobility and Session procedures, and according to dedicated procedure for Secondary RAT Usage Data Reporting. Only a subset of protocol messages transmitted between eNodeBs and the MME can include usage data reports. The usage data reports are subsequently forwarded by the MME to an SGW, conditionally indicating also a PGW as an intended receiver. If the PGW is indicated as a receiver may e.g. be determined by current MME configuration, and may show in that an IRPGW flag is set.

The concern is that at deactivation of a default bearer connection the last sent usage data reports are lost due to that the usage data reports are received by the MME too late in the procedure, i.e. when the PDN connection has already been terminated. When the SGW sends a Delete Bearer Request to the MME to delete the default bearer of the last PDN connection for a UE, the MME initiates an explicit detach of the UE from the PDN connection and sends a Delete Bearer Response in return to the SGW. When a UE Context Release Complete message, transmitted by an eNodeB, is received by the MME the PDN connection may already be deleted in the MME and the SGW. This means that if there are usage data reports, resulting e.g. from utilization of services provided by a gNodeB and subsequently transmitted by the gNodeB to the eNodeB, in the UE Context Release Complete message, the MME cannot send these usage data reports to the SGW, since the usage data reports must relate to a PDN connection. Thus, the MME will discard the last usage data reports and thereby the data volume accounted for by such usage data reports will not be considered.

According to the disclosure the object of the disclosure may be accomplished by changing the procedure flow such that usage data information is transmitted before the communications network connection is terminated. This is achieved by the disclosure as defined by the appended claims.

A first aspect of the disclosure relates to a network management entity for handling mobility and session procedures for a user equipment, such as e.g. bearer activation and/or deactivation, in a communications network, the network management entity being configured to:
- receive a request message, transmitted by a network serving entity, indicating deletion of at least one bearer connection for a user equipment,
- transmit a release message towards a network entity, initiating release of the user equipment by deletion of a bearer connection,
- receive a complete message transmitted by the network entity, confirming that the user equipment is released by deletion of the bearer connection of the user equipment, and wherein the complete message comprises information regarding data usage, and
- transmit a response message towards the network serving entity, acknowledging deletion of the bearer connection of the user equipment, in response to, i.e. being triggered by, receiving the complete message.

An exemplary advantage of providing a network management entity configured according to this aspect of the disclosure is that the complete message, comprising information regarding data usage, is received by the network management entity before termination of the communications network connection, i.e. before the response message is transmitted by the network management entity towards the network serving entity. Thereby it can be ensured that the information regarding data usage is received by the network management entity before the response message is transmitted.

According to another particular aspect of the disclosure the network management entity, subsequently to performing:
- receive a request message, transmitted by a network serving entity, indicating deletion of a bearer connection for a user equipment, is configured to:
- transmit a detach message towards the user equipment, indicating detachment of the user equipment from the communications network connection, and
- receive an accept message transmitted by the user equipment, acknowledging detachment of the user equipment from the communications network connection,
before performing:
- receive a complete message.

According to one embodiment of this aspect of the disclosure this aspect is initiated by PGW, PDN Gateway, initiates bearer deactivation.

Thus, according to this aspect of the disclosure the network management entity is configured to:
- receive a request message, transmitted by a network serving entity, indicating deletion of at least one bearer connection for a user equipment,
- transmit a detach message towards the user equipment, indicating detachment of the user equipment from the communications network connection,
- receive an accept message transmitted by the user equipment, acknowledging detachment of the user equipment from the communications network connection,
- transmit a release message towards a network entity, initiating release of the user equipment by deletion of a bearer connection,
- receive a complete message transmitted by the network entity, confirming that the user equipment is released by deletion of the bearer connection of the user equipment, and comprising information regarding data usage, and
- transmit a response message towards the network serving entity, acknowledging deletion of the bearer connection of the user equipment, in response to, i.e. being triggered by, receiving the complete message.

As will be discussed more in detail below, according to one embodiment of the disclosure, which applies when Secondary RAT usage data reporting is configured for a PLMN, this aspect of the disclosure has the exemplary advantage that Secondary RAT usage data is received by a Mobility Management Entity, MME, before the last PDN connection of the UE is terminated, i.e. the MME receives a UE Context Release Complete message, comprising the Secondary RAT usage data, before the MME transmits a Delete Bearer Response message towards the SGW. Thereby no Secondary RAT usage data is lost at bearer connection deactivation. The Secondary RAT Usage Data Reports may further be forwarded by the MME to the SGW.

There are various embodiments in which the aspect of the disclosure can be realized, of which a few are listed below.

According to one embodiment of the disclosure the response message, transmitted by the network management entity towards the network serving entity, comprises the information regarding data usage. Thereby the usage data report can be forwarded by the network management entity to the network serving entity before the PDN connection is terminated. Thus, according to one embodiment of the disclosure the response message, transmitted by the network management entity towards the network serving entity, comprises the information regarding data usage.

According to yet an embodiment of the disclosure the network management entity is a Mobility Management Entity, MME. According to another embodiment the network serving entity, that the network management entity is configured to receive the request message from, and/or transmit the response message towards, is a Serving Gateway, SGW.

According to one embodiment the communications network comprises an Evolved Packet System, EPS, network.

According to one embodiment of the disclosure the bearer connection that is requested to be terminated is the default bearer connection of the last PDN connection for the UE.

According to another embodiment the network entity, to which the network management entity is configured to transmit the release message towards, and/or receive the complete message from, is a radio access network node, such as an E-UTRAN Node B, eNodeB.

According to a further embodiment the complete message is a UE Context Release Complete message and the information regarding data usage comprises Secondary RAT Usage Data Reports. The Secondary RAT Usage Data Reports may be transmitted towards the eNodeB by a Secondary Radio Access Technology entity, e.g. a gNodeB of a New Radio network, and the data usage information reported may relate to usage of respective Secondary Radio Access Technology, Secondary RAT. The Secondary RAT Usage Data Reports may e.g. also relate to usage of the unlicensed spectrum radio communications network. This will be discussed more in detail in the detailed description.

According to an embodiment the detach message is a Detach Request message. The detach message may be transmitted by the network management entity towards the user equipment via a network entity. According to another embodiment the accept message may be a Detach Accept message. The accept message is transmitted by the user equipment towards the network management entity via a network entity. According to another embodiment the network entity that the network management entity is configured to transmit a detach message towards and/or receive an accept message from may be an E-UTRAN Node B, eNodeB.

According to further exemplary embodiments of the disclosure the request message may be a Delete Bearer Request message, the release message may be a UE Context Release Command message and the response message may be a Delete Bearer Response message. The Delete Bearer Request message may refer to deleting multiple bearer connections at the same time. According to the present disclosure, at least one of these bearer connections is a default bearer connection of the last PDN connection.

Another aspect of the disclosure relates to a method in a network management entity for bearer deactivation in a communications network, the method comprising the method steps of:
receiving a request message transmitted by a network serving entity, indicating deletion of a bearer connection for a user equipment,
transmitting a release message towards a network entity,
receiving a release complete message transmitted by the network entity, confirming that the user equipment is released, and wherein the release complete message also comprises information regarding data usage, and
transmitting a response message towards the network serving entity, acknowledging deletion of the bearer connection of the user equipment, in response to receiving the complete message.

This aspect of the disclosure may, according to some embodiments, further relate to a method in a network management entity wherein subsequently to performing the method step of:
receiving a request message transmitted by a network serving entity, indicating deletion of a bearer connection for a user equipment,
the method comprises the method steps of:
transmitting a detach message towards the user equipment, indicating detachment of the user equipment from the communications network connection, and
receiving a detach accept message transmitted by the user equipment, acknowledging detachment of the user equipment from the communications network connection,
before the method step of:
transmitting a release message towards a network entity, is performed.

Thus, according to this aspect of the disclosure, the disclosure relates to a method in a network management entity configured for handling bearer activation and/or deactivation in a communications network, the method comprising the method steps of:
receiving a request message transmitted by a network serving entity, indicating deletion of a bearer connection for a user equipment,
transmitting a detach message towards the user equipment, indicating detachment of the user equipment from the communications network connection,
receiving a detach accept message transmitted by the User Equipment, acknowledging detachment of the user equipment from the communications network connection,
transmitting a release message towards a network entity, initiating release of the user equipment by deletion of a bearer connection,
receiving a release complete message transmitted by the network entity, confirming that the user equipment is released by deletion of the bearer connection of the user equipment, and
comprising information regarding data usage, and
transmitting a response message towards the network serving entity, acknowledging deletion of the bearer connection of the user equipment, in response to, i.e. being triggered by, receiving the complete message.

These methods, and other herein disclosed embodiments of methods of the disclosure, provides the same advantages as presented for the network management entities configured for performing respective method.

There are also various embodiments in which this aspect of the disclosure can be realized, of which a few are listed below.

According to one embodiment of this further aspect the response message, transmitted by the network management entity towards the network serving entity, comprises the information regarding data usage. Thereby the usage data report can be forwarded by the network management entity to the network serving entity before the PDN connection is terminated. The network serving entity may in turn forward the information regarding data usage to the PGW for further processing.

According to an embodiment of the disclosure the network management entity, in which the method is performed, is a Mobility Management Entity, MME.

According to another embodiment of the disclosure the network serving entity, that the network management entity, in which the method is performed, is configured to receive the request message from, and/or transmit the response message towards, is a Serving Gateway, SGW.

According to an embodiment of the disclosure the communications network, comprising the management entity in which the method is performed, may comprise an Evolved Packet System, EPS.

According to one embodiment of the disclosure the network entity to which the network management entity, in which the method is performed, is configured to transmit the release message towards, and/or receive the complete message from, is an E-UTRAN Node B, eNodeB.

According to yet an embodiment of the disclosure the complete message, received by the network management entity in which the method is performed, is a UE Context Release Complete message and the information regarding data usage comprises Secondary RAT Usage Data Reports.

According to one embodiment of the disclosure the information regarding data usage relate to data usage over a Secondary Radio Access Technology communications network. According to yet other embodiments of the disclosure the information regarding data usage relate to; data usage of a New Radio communications network, or data usage over an unlicensed spectrum radio communications network.

According to another embodiment of the disclosure the detach message transmitted by the network management entity, in which the method is performed, is transmitted towards the user equipment via a network entity.

According to a further embodiment of the disclosure the accept message is transmitted by the user equipment to the network management entity, in which the method is performed, via a network entity.

According to an embodiment of the disclosure the network entity that the network management entity, in which the method is performed, is configured to transmit a detach message towards and/or receive a complete message from is an E-UTRAN Node B, eNodeB.

According to one further aspect of the disclosure network management entities, network serving entities and network entities are provided in the communications network as virtual machines, VM, or as container-based applications.

One further aspect of the disclosure refers to a computer program comprising computer-executable instructions enabling a network management entity according to the disclosure to perform the method steps of any method according to the disclosure, when the computer-executable instructions are executed on a processing unit, such as e.g. a single or distributed computer device, included in the management entity. Yet one aspect of the disclosure refers to a computer program product comprising a computer readable medium, the computer readable medium having such a computer program stored thereon.

PGW initiated bearer deactivation is also performed when handover between a 3GPP to a non-3GPP network is performed, in which case a default bearer, and all dedicated bearers associated with the PDN address are released. Bearer deactivation due to 3GPP to non-3GPP handover may be initiated by that a request message, transmitted by an SGW and received by an MME, comprises a cause-code indicating handover.

Thus, further aspects of the disclosure refer to a method in a network management entity, and to a network management entity configured to perform such method, for handover between a 3GPP network and a non-3GPP network. The method comprises the method steps of:

receiving a request message transmitted by a network serving entity, indicating deletion of a bearer connection for a user equipment, wherein the request message comprise a cause-code indicating handover to a non-3GPP network, transmitting a release message towards a network entity, receiving a release complete message transmitted by the network entity, confirming that the user equipment is released by deletion of a bearer connection of the user equipment, and comprising information regarding data usage, and transmitting a response message towards the network serving entity, acknowledging deletion of the bearer connection of the user equipment, in response to, i.e. being triggered by, receiving the complete message.

According to an embodiment of this further aspect of the disclosure the cause-code can be set to indicate handover from a 3GPP network to a non-3GPP network by set the cause to RAT changed from 3GPP to Non-3GPP.

According to yet an embodiment of this further aspect of the disclosure the bearer connection requested to be deleted may be the default bearer connection of the last PDN connection for the UE.

For this further aspect of the disclosure the messages transmitted and received, and entities involved in performing the method performed at handover between a 3GPP network and a non-3GPP network, may be the same messages and entities involved in other exemplary aspects of methods disclosed herein, i.e. the network management entity may be an MME, the network serving entity may be an SGW, the network entity may be an eNodeB, the request message may be a Delete Bearer Request message, the release message may be a UE Context Release Command message, the release complete message may be a UE Context Release Complete message, the information regarding data usage may be Secondary RAT Usage Data Reports and the response message may be a Delete Bearer Response message. The method may be performed in a connections network comprising an EPS network.

The disclosure also relates to a network management entity configured for performing such a method of handover between a 3GPP network and a non-3GPP network.

The method, as well as a network management entity configured for performing the method, provides the exemplary advantage that information regarding data usage, e.g. Secondary RAT Usage Data Reports, are not lost at handover from a 3GPP network to a non-3GPP network.

When herein referring to User Equipment, UE, herein this is considered to comprise e.g. terminal devices, communication devices etc., i.e. use cases where the actual user may not be a human being but an electronic device, a vehicle device, home appliances, a sensor device, a virtual machine or similar.

When herein referring to entity what is considered may be defined as a network functionality. A network functionality may be implemented either as a network element on dedicated hardware, as a software instance running on a dedicated hardware or as a virtualized function instantiated on an appropriate platform, e.g., a cloud infrastructure. An entity may e.g. be what generally is referred to as a node of a communications network. When referring to a processing unit, or a computer device, this is considered to include both a single entity capable of performing calculations as well as a plurality of collaborating, distributed entities.

The embodiments disclosed herein are not limited to the features and advantages explicitly mentioned herein. A person skilled in the art will recognize additional features and advantages upon reading the following detailed description.

BRIEF DESCRIPTION OF THE DRAWINGS

The disclosure may best be understood by referring to the following description and accompanying figures that are used to illustrate particular embodiments of the disclosure.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
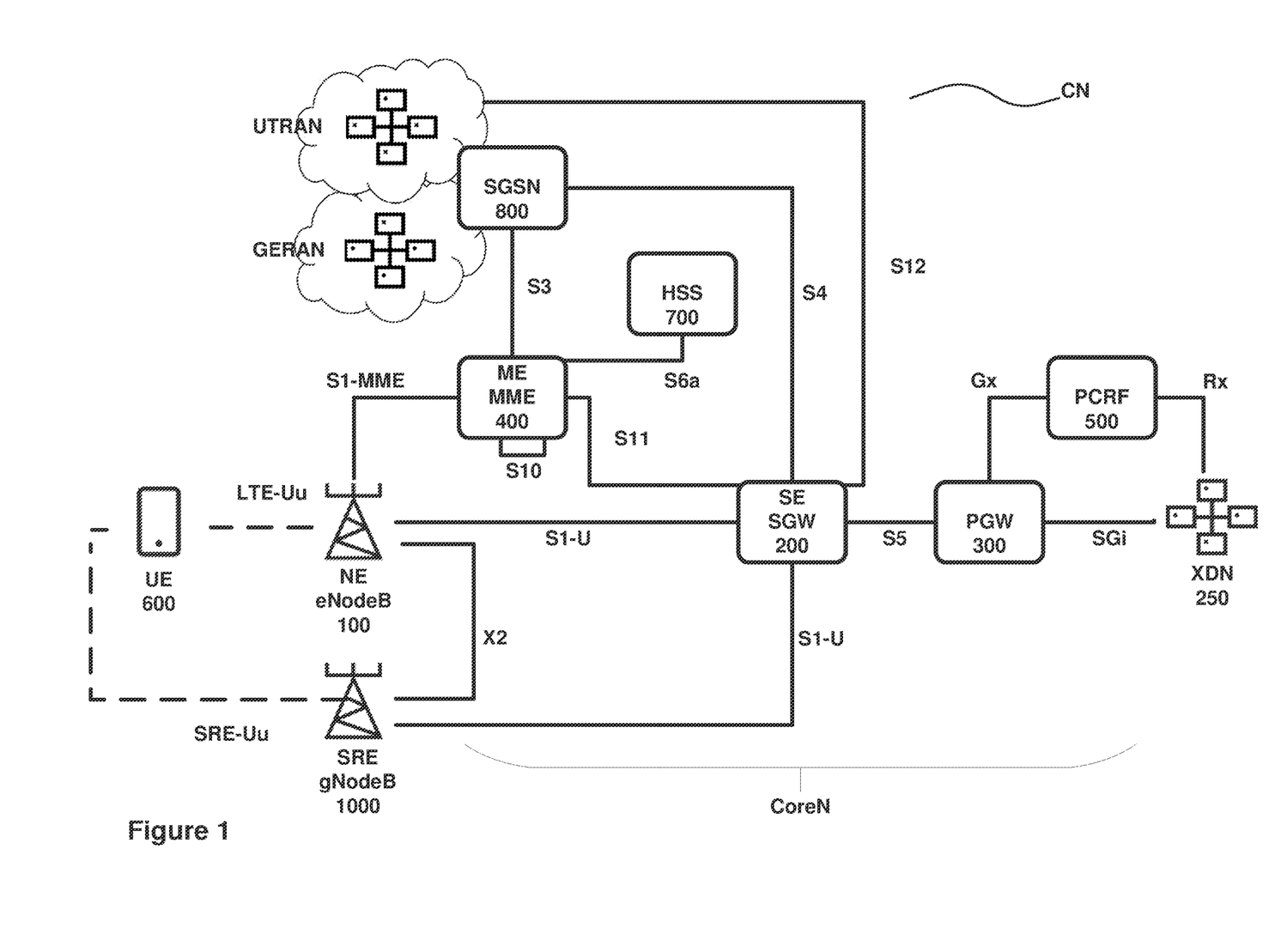
FIG. 1 illustrates one example of a communications network.

FIG. 1 shows a schematic illustration of an example of a well-known communications network CN, or wireless communication system, in the form of an LTE-based architecture. It should be emphasized that the terms "LTE" and "LTE-based" system is used herein to comprise both previous, present and future LTE based systems, such as, for example, advanced LTE systems. An LTE based system may be operatively connected to New Radio, NR, based system, indicated in FIG. 1 by that an eNodeB 100 and a UE 600 are operatively connected to a Secondary RAT entity SRE 1000, which may be a Secondary RAT node, in FIG. 1 in form of a next Generation Node B, i.e. gNodeB. The eNodeB 100 being operatively connected to the gNodeB 1000 provides New Radio, also referred to as 5G, capabilities via the LTE network. The gNodeB 1000 is also operatively connected to a network serving entity SE, according to the embodiment of FIG. 1 in form of a Serving Gateway SGW 200. Further, it should be appreciated that although FIG. 1 shows a wireless communication system in the form of an LTE-based system, the example embodiments herein may also be utilized in connection with other wireless communication systems, such as e.g. Global System for Mobile Communication, GSM, or Universal Mobile Telecommunications System, UMTS, comprising nodes and functions that correspond to the nodes and functions of the system in FIG. 1.

As can be seen in FIG. 1, the communications network CN comprises a network entity NE, in FIG. 1 a base station in the form of an E-UTRAN Node B, eNodeB, 100 operatively connected to the SGW, 200 in turn operatively connected to a network management entity ME, according to the embodiment of FIG. 1 in form of a Mobility Management Entity, MME, 400 and a PDN Gateway, PGW, 300 which in turn is operatively connected to a Policy and Charging Rules Function, PCRF, 500. The SGW 200, MME 400, PGW 300 and the PCRF 500 are all examples of core network entities or nodes forming the core network, CoreN, while an eNodeB 100 is an example of a radio access network node of a radio access network, RAN, which generally is referred to as E-UTRAN for LTE-based systems. An LTE-based system may, in addition to the core network nodes defined herein, comprise a number of additional network nodes or network entities, but for reason of clarity such network nodes are omitted herein. The core network nodes MME 400, SGW 200, PGW 300, PCRF 500 of the core network CoreN communicate or interfaces with each other by means of GTP messages. GTP messages, i.e. General Packet Radio Service, GPRS, Tunneling Protocol messages, can be defined as a format for transferring data between respective entities. The eNodeB 100 is a radio access network node that interfaces with, i.e. may be operatively connected to, a radio terminal, which herein is referred to as user equipment, UE, 600. UE is also the denomination generally used in LTE. The eNodeB 100 interfaces with the gNodeB 1000 of a New Radio system via an interface, herein denoted X2.

The core network CoreN in an LTE-based system is generally known as Evolved Packet Core, EPC, and the EPC is together with E-UTRAN, eNodeBs, RAN generally referred to as the EPS in LTE. In the embodiment shown in FIG. 1 the LTE system is operatively connected to a New Radio system, indicated by the eNodeB 100 and UE 600 being operatively connected to the gNodeB 1000. The gNodeB 1000 is also operatively connected to a Serving Gateway SGW 200. The core network CoreN is also operatively connected to an external data network, XDN, 250 providing operator IP services. An example of a XDN 250 network is a PDN network, such as e.g. the internet.

The general functionality of SGW 200, MME 400, PGW 300 and PCRF 500 nodes are briefly disclosed below.

The Serving Gateway, SGW, 200 routes and forwards user data packets over the S1-U interface, whilst also acting as the mobility anchor for the user plane during inter-eNodeB handovers and as the anchor for mobility between LTE and other 3GPP technologies, i.e. terminating S4 interface and relaying the traffic between 2G/3G systems and PGW 300. The SGW 200 communicates with the MME 400 via interface S11 and with PGW 300 via interface S5. The SGW 200 may also communicate with the UMTS Radio Access Network, UTRAN, and the GSM Edge Radio Access Network, GERAN, via S12 interface. An SGW 200 is an example of a network serving entity, SE. The UE 600 of FIG. 1 is simultaneously associated with both an LTE eNodeB 100, which is operatively connected to the UE 600 via an LTE-Uu interface, and to a Secondary RAT entity SRE 1000, in FIG. 1 in form of a NR gNodeB, which is operatively connected to the UE 600 via an SRE-Uu.

The Management Mobility Entity, MME, 400 is a key control-node for the LTE access-network. The MME 400 holds information about all bearer connections, and even if no data is transferred via the MME 400 the MME 400 enables data to be transferred over respective bearer connection. It is responsible for idle mode UE tracking and paging procedure including retransmissions. It is involved in the bearer connection activation/deactivation process and is also responsible for choosing the SGW 200 for a UE 600 at the initial attach and at time of intra-LTE handover involving core network, CoreN, node relocation. As previously disclosed, a default or dedicated bearer connection is an information transmission path of defined capacity, delay and bit error rate, etc. set up between nodes of a communications network, thus an IP packet flow with a defined QoS, quality of service. The Non-Access Stratum, NAS, signaling terminates at the MME 400 and it is also responsible for generation and allocation of temporary identities to UEs 600 via the S1-MME interface. It checks the authorization of the UE 600 to camp on the service provider's Public Land Mobile Network, PLMN, and enforces UE 600 roaming restrictions. The MME 400 is the termination point in the network for ciphering/integrity protection for NAS signaling and handles the security key management. Lawful interception of signaling is also supported by the MME 400. The MME 400 also provides the control plane function for mobility between LTE and 2G/3G access networks with the S3 interface terminating at the MME 400 from a Serving General Packet Radio Service, GPRS, Support Node, SGSN, 800. The MME 400 terminates the S6a interface towards the home HSS 700, e.g. for roaming UEs 600. Further, there is an interface S10 configured for communication between MMEs 400 for MME relocation and MME-to-MME information transfer. An MME 400 is an example of a network management entity, ME.

The PGW 300 provides connectivity, herein generally referred to as connects, for the UE 600 to XDN 250 by being the point of exit and entry of traffic for the UE 600. The XDN 250 may be an operator external public or private packet data network, PDN, or an intra operator PDN, e.g. for providing IP Multimedia Subsystem, IMS, services, or internet services. A UE 600 may have simultaneous connectivity with more than one PGW 300 for accessing multiple PDNs. Typically, the PGW 300 performs one or more of; policy enforcement, packet filtering for each user, charging support, lawful Interception and packet screening. Another key role of the PGW 300 is to act as the anchor for mobility between 3GPP and some non-3GPP technologies such as WiMAX and 3GPP2 (CDMA 1× and EvDO). The interface between the PGW 300 and the XDN 250 is referred to as the SGi.

The PCRF 500 determines policy rules in real-time with respect to the UEs 600, or radio terminals, of the communications network CN. This may e.g. include aggregating information in real-time to and from the core network CoreN and operational support systems etc. of the system so as to support the creation of rules and/or automatically making policy decisions for UEs 600 currently active in the communications network CN based on such rules or similar. The PCRF 500 provides the PGW 300 with such rules and/or policies or similar to be used by the acting as a Policy and Charging Enforcement Function, PCEF, via interface Gx. The PCRF 500 further communicates with the XDN 250 via the Rx interface.

In FIG. 1 the Secondary RAT entity SRE 1000, is disclosed as a gNodeB of a New Radio system, NR, i.e. what generally is referred to as 5G. However, also other Secondary RATs, thus other Secondary RAT entities SRE 1000, are feasible. An example of another Secondary RAT is communication over the unlicensed spectrum radio communications network. The Secondary RAT Usage Data Reports refer to respective Secondary Radio Access Technology.

Figure 2:
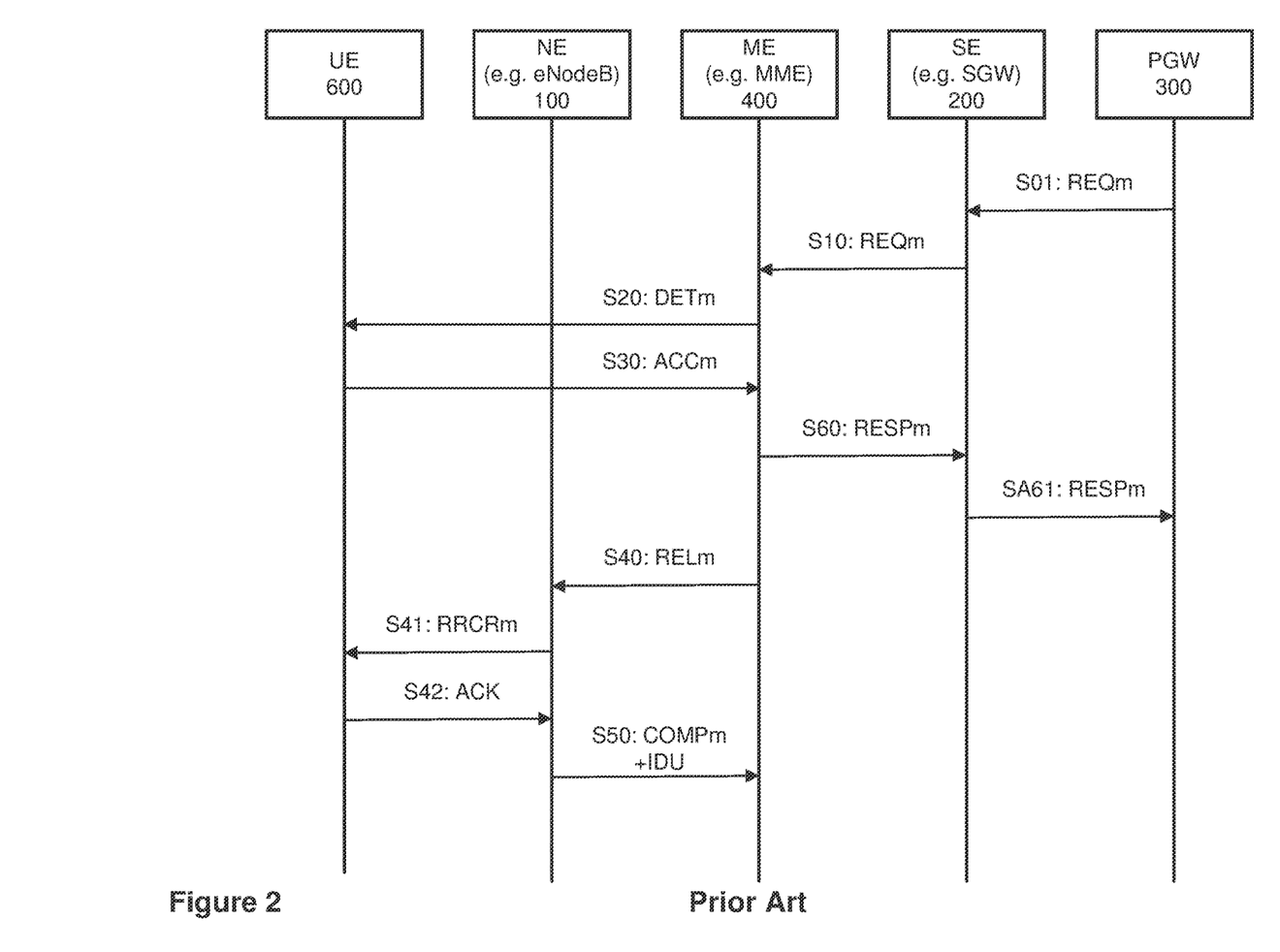
FIG. 2 discloses a prior art signaling diagram illustrating communication according to 3GPP TS 23.401.

FIG. 2 schematically discloses a prior art Mobility and Session service procedure workflow for bearer connection deactivation as described in 3GPP technical specification 23.401, V16.1.0, corresponding to FIG. 5.4.4.1-1 of 3GPP TS 23.401, V16.1.0.

Bearer deactivation may be triggered e.g. by an IP-CAN Session Modification, i.e. by a change in the network service provided, which in turn may be triggered by e.g. receiving a Policy Control and Charging decision message transmitted by a PCRF 500. According to the procedure the bearer connection deactivation is initiated by; a PGW 300;
transmitting S01 a Delete Bearer Request message REQm towards the SGW 200, whereby the SGW 200 subsequently performs;
transmitting S10 the Delete Bearer Request message REQm towards the MME 400.
The MME 400 detaches a UE 600 by:
transmitting S20 a Detach Request message DETm towards the UE 600 via an eNodeB 100 of the PDN connection.
The Detach Request message DETm is only sent when the default bearer connection of the last PDN connection is deleted.
The UE 600 receives the Detach Request message DETm transmitted by the MME 600 and returns the message by;
transmitting S30 a Detach Accept message ACCm towards the MME 400 via an eNodeB 100 of the PDN connection.
The eNodeB 100 forwards the Detach Accept message ACCm to the MME 400, preferably together with Tracking Area Information, TAI, and E-UTRAN Cell Global Identifier, ECGI, of the current cell of the UE 400. However, the eNodeB 100 has no possibility to include potential Secondary RAT Usage Data Reports in the forwarded message. The eNodeB 100 simply encapsulates the Detach Accept message ACCm, and cannot add additional information to the message, before forwarding the message. The MME 400 subsequently performs;
transmitting S60 a Delete Bearer Response message RESPm towards the SGW 200. After receiving the Delete Bearer Response message RESPm from the MME 400 the SGW 200 deletes the bearer context related to the deactivated bearer connection and acknowledges the bearer deactivation to the PGW 300 by;
transmitting S61 a Delete Bearer Response message RESPm message towards the PGW 300.
The bearer connection release or deletion is finalized by that the MME 400 terminates the bearer connection by;
transmitting S40 an UE Context Release Command message RELm towards the eNodeB 400 from which the Detach Accept message ACCm was received.
If the connection between the UE 600 and the eNodeB 100 is not already terminated the eNodeB 100 performs;
transmitting S41 a Radio Resource Control, RRC, Connection Release message RRCRm towards the UE 600;
receiving S42 an acknowledgement message ACK, transmitted by the UE 600 in return thereof, and, after terminating the bearer connection between the UE 600 and the eNodeB 100, i.e. terminating the UE context;
transmitting S50 a UE Context Release Complete message COMPm +IDU towards the MME 400.

The UE Context Release Complete message may include Secondary RAT Usage Data Reports, indicated in FIG. 2 by that +IDU, Information regarding Data Usage, is added to the UE Context Release Complete message, but when the MME 400 receives the UE Context Release Complete message COMPm from the eNodeB 100 the PDN connection is already terminated. Thereby the usage data reports of the UE Context Release Complete messages COMPm +IDU cannot be forwarded to the SGW 200 and are discarded.

As previously discussed, the concern is that at a PGW 300 initiated bearer deactivation the last sent usage data reports are lost due to that the usage data reports are received by the MME 400 too late in the procedure, i.e. when the PDN connection has already been terminated.

Figure 3:
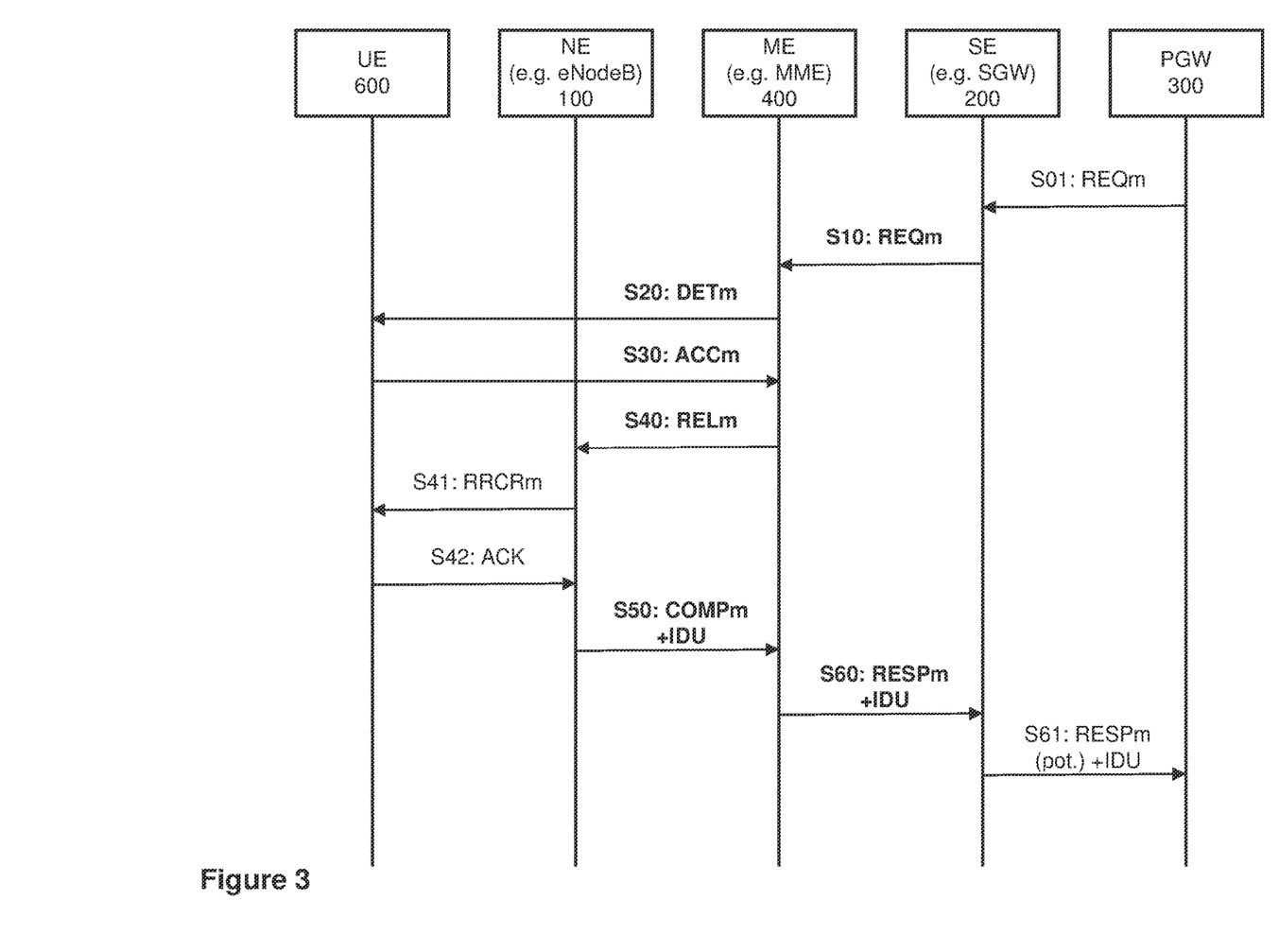
FIG. 3 discloses a signaling diagram illustrating communication according to an exemplary embodiment of the disclosure.

FIG. 3 discloses a signaling diagram illustrating communication according to an exemplary embodiment of the disclosure. The method illustrated is performed in a network management entity ME. As previously disclosed the procedure of bearer connection deactivation may be initiated by a that a PGW 400 transmits S01 a Delete Bearer Request message REQm towards the SGW 200, whereinafter the network management entity ME is configured to perform:
receive S10 a request message REQm, transmitted by a network serving entity SE, indicating deletion of a bearer connection for a user equipment UE, 600,
transmit S20 a detach message DETm towards the user equipment UE, 600,
receive S30 an accept message ACCm transmitted by the user equipment UE, 600,
transmit S40 a release message RELm towards a network entity NE,
receive S50 a complete message COMPm +IDU transmitted by the network entity NE, confirming that the user equipment UE, 600 is released by deletion of a bearer of the user equipment UE, 600, and
comprising information regarding data usage IDU, and
transmit S60 a response message RESPm +IDU towards the network serving entity SE, acknowledging deletion of the bearer connection of the user equipment UE, 600, in response to receiving the complete message COMPm +IDU.

In FIG. 3, the addition +IDU indicates respective message comprises information regarding data usage.

The response message RESPm may comprise the information regarding data usage +IDU. After receiving the response message RESPm (+IDU) the SGW 200 acknowledges the bearer connection deletion by that the SGW transmits S61 a response message RESPm, such as a Delete Bearer Response message, to the PGW 300.

If an IRPGW flag is set the SGW 200 will forward the information regarding data usage IDU to the PGW 300. Thus, potentially the response message RESPm may comprise information regarding data usage +IDU, indicated by the addition of (pot.) +IDU to the response message RESPm (pot.) +IDU transmitted by the SGW 200 in FIG. 3.

The Delete Bearer Request message REQm may indicate deletion of the default bearer and also of a number of dedicated bearers. According to embodiments the default bearer may be the default bearer of the last PDN connection.

According to an exemplary embodiment of the disclosure the network management entity ME is a Mobility Management Entity, MME, and the network serving entity SE, that the network management entity ME is configured to receive the request message REQm from, and/or transmit the response message RESPm towards, is a Serving Gateway, SGW.

Further, the network entity NE to which the network management entity ME is configured to transmit the release message RELm towards, and/or receive the complete message COMPm from, may be an E-UTRAN Node B, eNodeB.

According to exemplary embodiments of the disclosure the request message REQm may be a Delete Bearer Request message, the detach message DETm may be a Detach Request message, the accept message ACCm may be a Detach Accept message, the release message RELm may be a UE Context Release Command message and the response message RESPm may be a Delete Bearer Response message.

The complete message COMPm may be a UE Context Release Complete message and the information regarding data usage IDU may comprise Secondary RAT Usage Data Reports.

According to embodiments of the disclosure the detach message DETm, transmitted by the network management entity ME towards the user equipment UE 600, and/or the accept message ACCm, transmitted by the user equipment UE 600 to the network management entity ME, may be transmitted via a network entity NE. According to another embodiment such network entity NE may be an E-UTRAN Node B, eNodeB 100.

For clarification purpose it should be mentioned that subsequently of receiving the release message RELm in method step S40 the eNodeB 100 may perform the method steps of;
transmitting S41 a Radio Resource Control, RRC, Connection Release message RRCRm towards the UE 600; and
receiving S42 an acknowledgement message ACK, transmitted by the UE 600 in return thereof.

According to an advantageous embodiment of the disclosure, wherein the communications network is an LTE-based network and wherein the communications network CN comprises an EPS network, and the network management entity ME is a Mobility Management Entity, MME, the MME being configured to:
receive S10 a Delete Bearer Request message transmitted by an SGW 200, indicating deletion of a bearer connection for a user equipment UE, 600,
transmit S20 a Detach Request message towards the user equipment UE, 600,
receive S30 a Detach Accept message transmitted by the user equipment UE, 600,
transmit S40 a UE Context Release Command message towards a network entity eNodeB 100,
receive S50 a UE Context Release Complete message transmitted by the eNodeB 100, confirming that the user equipment UE, 600 is released by deletion of the bearer connection of the user equipment UE, 600, and comprising Secondary RAT Usage Data Reports, and
transmit S60 a Delete Bearer Response message towards the SGW 200, acknowledging deletion of the bearer connection for a user equipment UE, 600, in response to receiving the UE Context Release Complete message.

Thereby the Secondary RAT usage data is received by the Mobility Management Entity, MME, before the PDN connection is deleted, i.e. the MME receives a UE Context Release Complete message, comprising the Secondary RAT usage data, before the MME transmits a Delete Bearer Response message. Thereby no Secondary RAT usage data is lost at bearer connection deactivation.

Figure 4:
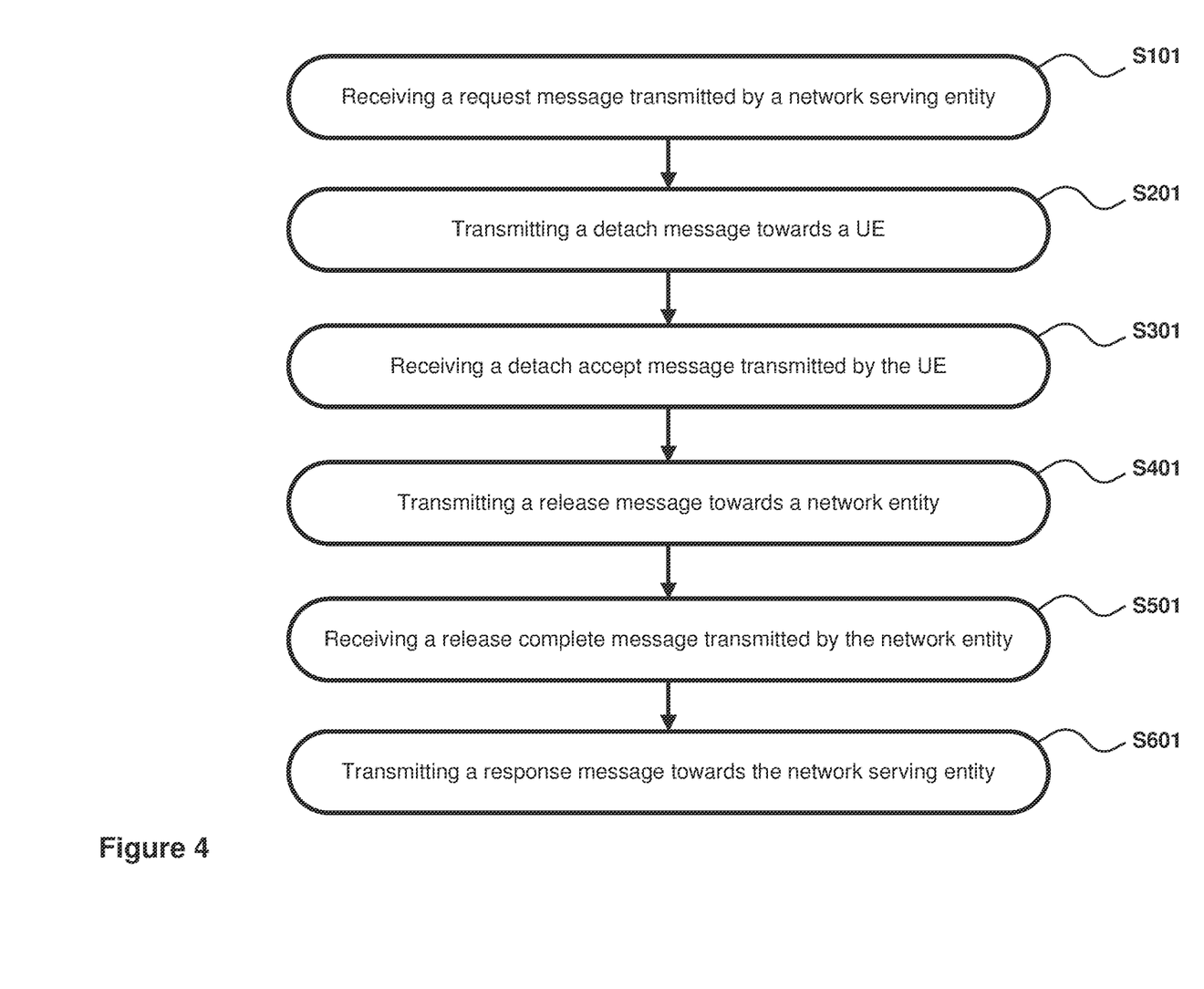
FIG. 4 discloses a flow chart schematically illustrating a method of the disclosure.

The bearer connections are either of default bearer type or dedicated bearer type. Each dedicated bearer is generally dedicated to a specific service and has a specific QoS. According to one embodiment of the disclosure one of the bearer connection that is requested to be terminated in method operation S10 is the default bearer connection of the last PDN connection of a UE. FIG. 4 discloses a flow chart schematically illustrating a method of the disclosure. According to an embodiment of the disclosure, the method performed in a network management entity ME is performed in a communications network CN, wherein such communications network CN may comprise an EPS network.

As previously disclosed the procedure of bearer connection deactivation may be initiated by a PGW 400 performing;
transmitting a Delete Bearer Request message REQm to the SGW 200, whereinafter the method of the disclosure is performed.

The method comprises the method steps of:
receiving S101 a request message REQm transmitted by a network serving entity SE, indicating deletion of a bearer connection for a user equipment UE,
transmitting S201 a detach message DETm towards the user equipment UE,
receiving S301 a detach accept message ACCm transmitted by the user equipment UE,
transmitting S401 a release message RELm towards a network entity NE,
receiving S501 a release complete message COMPm +IDU transmitted by the network entity NE, confirming that the user equipment UE is released by deletion of a bearer of the user equipment UE, and comprising information regarding data usage IDU, and
transmitting S601 a response message RESPm +IDU towards the network serving entity SE, acknowledging deletion of a bearer connection of a user equipment UE, in response to receiving the complete message COMPm +IDU.

Figure 5:
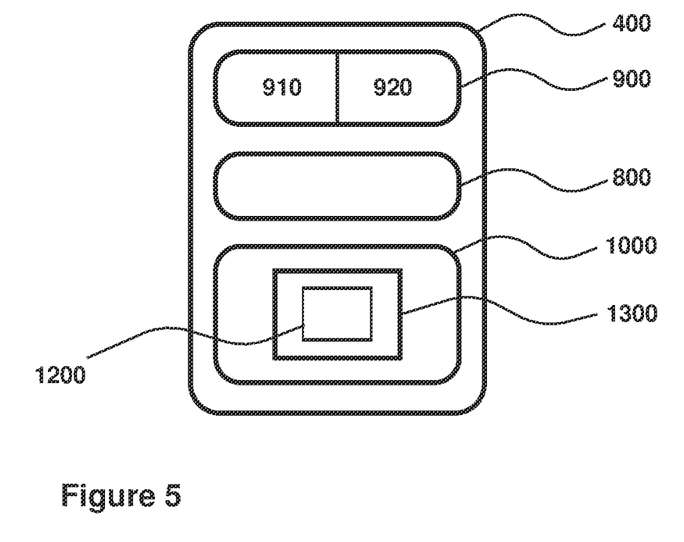
FIG. 5 schematically illustrates an exemplary embodiment of a network management entity according to the disclosure.

FIG. 5 schematically illustrates an exemplary embodiment of a network management entity ME according to the disclosure. The network management entity ME may be arranged to be operatively connected to a plurality of other nodes and/or entities of a communications network. The embodiment of a network management entity ME of FIG. 5 comprises storing means 800 and communication means 900, in turn comprising receiving means 910, adapted to receive messages from other communications network entities, and delivering means 920 adapted to transmit messages towards other communication network entities. The means 800, 910, 920 may comprise communications interfaces for receiving and providing information between one another and other means and/or functionalities, and a local storage means each for storing data. The means 800, 910, 920 may further be implemented by a processor embodied in the form of one or more microprocessors arranged to execute a computer program downloaded to a suitable storage medium associated with the microprocessor, such as a RAM, a Flash memory or a hard disk drive.

The network management entity comprises a processing unit 1000, comprising a computer program 1200, in turn comprising computer-executable instructions enabling the management entity ME to perform the method steps of any embodiment of methods of the disclosure. The computer-executable instructions may be executed by the processing unit 1000. FIG. 5 also disclose a computer program product comprising a computer readable medium 1300, the computer readable medium 1300 having the computer program 1200 stored thereon.

According to an exemplary embodiment of the disclosure the network management entity ME is configured to e.g.:
receive S10 a request message REQm, transmitted by a network serving entity SE, indicating deletion of a bearer connection for a user equipment UE,
transmit S20 a detach message DETm towards the user equipment UE,
receive S30 an accept message ACCm transmitted by the user equipment UE,
transmit S40 a release message RELm towards a network entity NE,
receive S50 a complete message COMPm +IDU transmitted by the network entity NE, confirming that the user equipment UE is released by deletion of a bearer of the user equipment UE, and
comprising information regarding data usage IDU, and
transmit S60 a response message RESPm +IDU towards the network serving entity SE, acknowledging deletion bearer connection of the user equipment UE, in response to receiving the complete message COMPm +IDU.

Embodiments of network management entities ME may also be configured to perform other methods disclosed herein.

According to an embodiment of the disclosure the network management entity ME may be a Mobility Management Entity, MME, 400.

As is apparent for a person skilled in the art the management entity ME may also comprise several additional components and/or functions, but for reason of clarity such components and/or functionalities have been omitted in FIG. 5.

Figure 6:
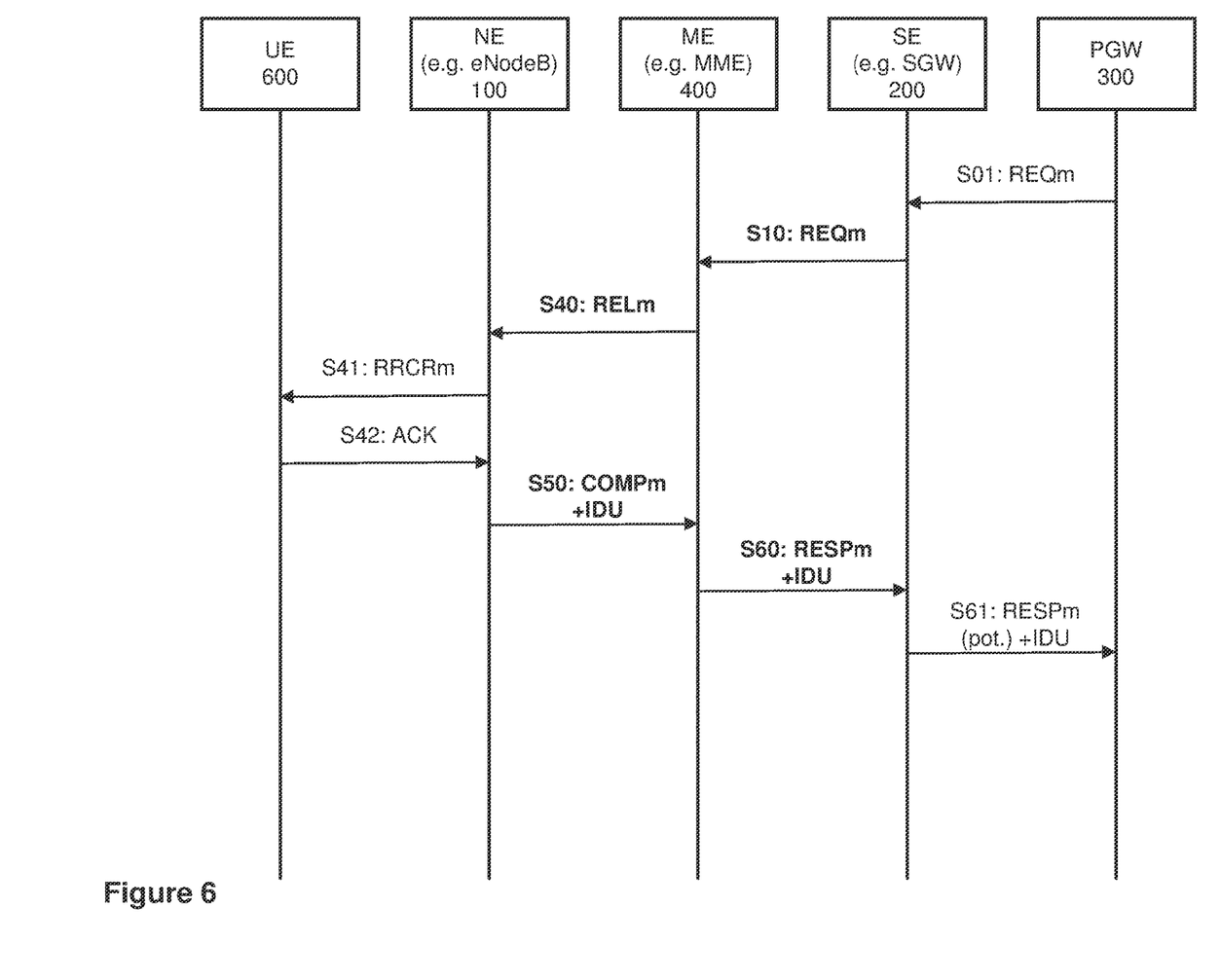
FIG. 6 discloses a signaling diagram illustrating communication according to another exemplary embodiment of the disclosure.

FIG. 6 discloses a signaling diagram illustrating communication according a to a general, exemplary embodiment of the disclosure. The method is initiated by that a network serving entity, e.g. an SGW, receives S01 a request message initiating bearer deactivation, whereinafter the network management entity ME, e.g. an MME, configured to perform such method, performs:
receive S10 a request message REQm, transmitted by the network serving entity SE, e.g. the SGW, indicating deletion of a bearer connection for a user equipment UE,
transmit S40 a release message RELm towards a network entity NE, e.g. an eNodeB,
receive S50 a complete message COMPm +IDU transmitted by the network entity NE, e.g. the eNodeB, confirming that the user equipment UE is released, and comprising information regarding data usage IDU, and
transmit S60 a response message RESPm +IDU towards the network serving entity SE, e.g. the SGW, acknowledging deletion of a bearer connection of the user equipment UE, e.g. the eNodeB, in response to receiving the complete message COMPm +IDU.

The messages transmitted and received may be the same messages transmitted and received in other exemplary aspects of methods disclosed herein, i.e. the request message REQm may be a Delete Bearer Request message, the release message RELm may be a UE Context Release Command message, the release complete message COMPm may be a UE Context Release Complete message and the response message RESPm may be a Delete Bearer Response message.

The method may e.g. be performed when bearer connection deactivation is initiated due to handover from a 3GPP connection to a non-3GPP connection. The method is for this embodiment initiated by that a network serving entity, e.g. an SGW, receives S161 a request message initiating that handover from a 3GPP network to a non-3GPP network is required due to the UE moving from 3GPP radio network coverage to non-3GPP radio network coverage.

The information regarding data usage IDU may be Secondary RAT Usage Data Reports, and thereby e.g. a handover from a 3GPP network to a non-3GPP network can be performed without losing usage data.

According to this exemplary embodiment of the disclosure the request message REQm, which may be a Delete Bearer Request message, may comprise a dedicated cause-code from handover to non-3GPP.

For clarification purpose it should be mentioned that subsequently of receiving the release message RELm in method step S410 the eNodeB 100 may perform the method steps of;
transmitting S411 a Radio Resource Control, RRC, Connection Release message RRCRm to the UE 600; and
receiving S421 an acknowledgement message ACK, transmitted by the UE 600 in return thereof.

Figure 7:
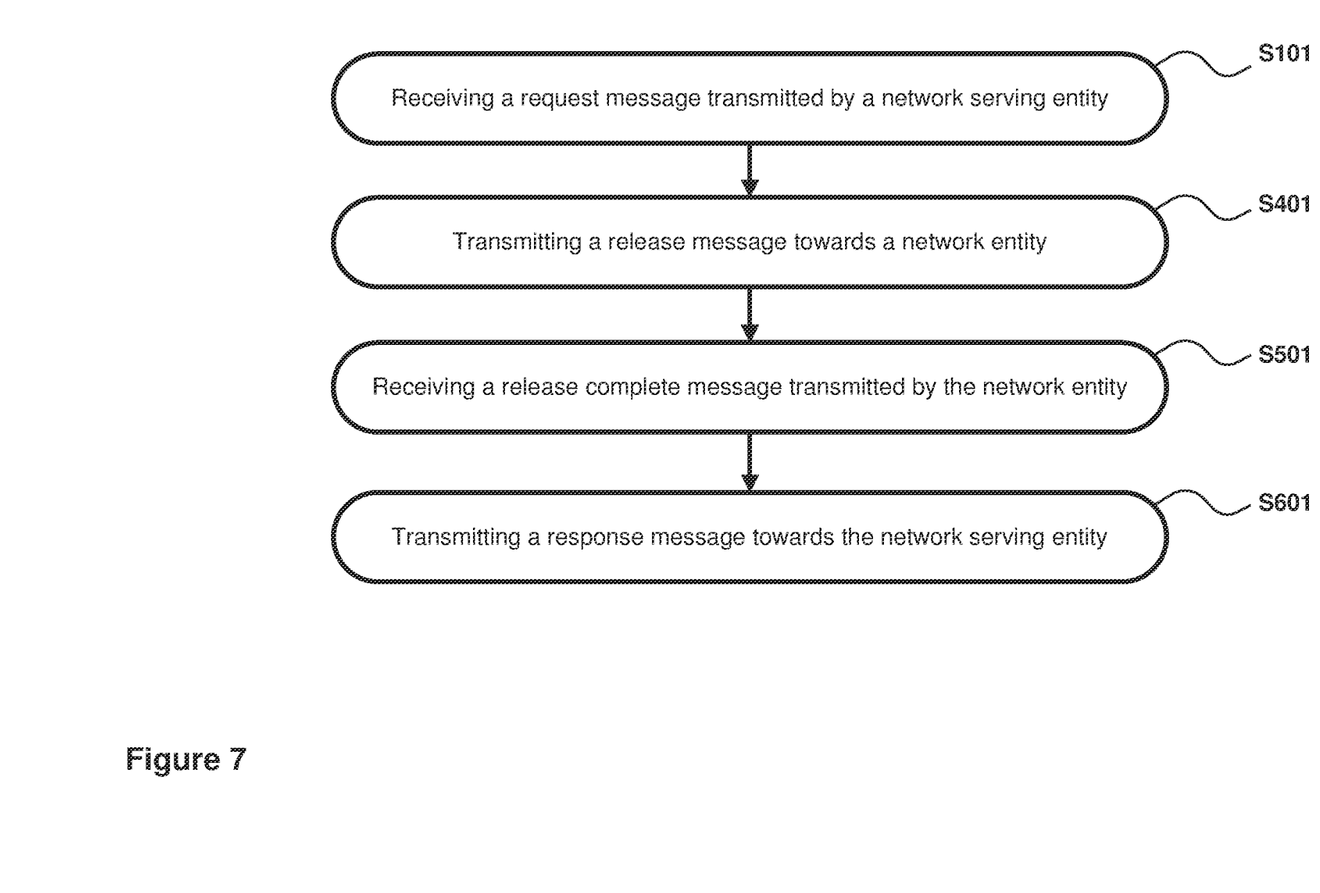
FIG. 7 discloses a flow chart schematically illustrating the method of FIG. 6.

FIG. 7 discloses a flow chart schematically illustrating the method of FIG. 6. The method comprises the method steps of:
receiving S101 a request message REQm transmitted by a network serving entity SE, i.e. an SGW, indicating deletion of a bearer connection for a user equipment UE,
transmitting S401 a release message RELm towards a network entity NE, e.g. an eNodeB,
receiving S501 a release complete message COMPm +IDU transmitted by the network entity NE, e.g. the eNodeB, confirming that the user equipment UE is released and comprising information regarding data usage IDU, and
transmitting S601 a response message RESPm +IDU towards the network serving entity SE, e.g. the SGW, acknowledging deletion of a bearer connection of the user equipment UE, in response to receiving the complete message COMPm +IDU.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A network management entity in a communications network, the network management comprising:
   a receiver for receiving a request message transmitted by a serving entity, the request message indicating deletion of a bearer connection for a user equipment (UE); and
   processing circuitry configured to cause the network management entity to perform a process in response to the network management entity receiving the request message transmitted by the serving entity, wherein the process comprises initiating a UE context release procedure, wherein
   initiating the UE context release procedure comprises:
      transmitting a detach message towards the UE;
      after transmitting the detach message towards the UE, receiving a detach accept message transmitted by the UE; and
      after receiving the detach accept message transmitted by the UE, transmitting towards a network entity serving the UE a UE Context Release Command message for causing the network entity serving the UE to release a context associated with the UE, and
   the network management entity is configured such that, in response to the network management entity receiving a UE Context Release Complete message transmitted by the network entity serving the UE, the network management entity transmits a response message towards the serving entity, the response message acknowledging deletion of the bearer connection of the UE, and
   the UE Context Release Complete message comprises information regarding data usage.

2. The network management entity of claim 1, wherein the detach message is transmitted by the network management entity towards the user equipment via the network entity.

3. The network management entity of claim 1, wherein a detach accept message is transmitted by the user equipment towards the network management entity via the network entity.

4. The network management entity of claim 1, wherein the network entity is an E-UTRAN Node B.

5. The network management entity of claim 1, wherein the response message comprises the information regarding data usage.

6. The network management entity of claim 1, wherein the network management entity is a Mobility Management Entity.

7. The network management entity of claim 1, wherein
   the response message comprises the information regarding data usage,
   the network entity is a base station,
   the network management entity is a Mobility Management Entity (MME), and
   the serving entity is a Serving Gateway.

8. The network management entity of claim 1, wherein the network entity which the network management entity is configured to transmit the UE Context Release Command message towards, and/or receive the complete message from, is an E-UTRAN Node B.

9. The network management entity of claim 1, wherein the information regarding data usage comprises a Secondary RAT Usage Data Report.

10. The network management entity of claim 1, wherein the request message comprises a dedicated cause-code initiating handover between a 3GPP network to non-3GPP network.

11. A method for bearer deactivation, the method comprising:
   a network management entity receiving a request message transmitted by a serving entity, the request message indicating deletion of a bearer connection for a user equipment (UE);
   after receiving the request message transmitted by the serving entity, transmitting a detach message towards the UE;
   after transmitting the detach message towards the UE, receiving a detach accept message transmitted by the UE;
   in response to the network management entity receiving the request message and after receiving the detach accept message transmitted by the UE, initiating a UE context release procedure, wherein initiating the UE context release procedure comprises transmitting towards a network entity serving the UE a UE Context Release Command message for causing a network entity serving the UE to release a context associated with the UE; and
   in response to the network management entity receiving a UE Context Release Complete message transmitted by the network entity serving the UE, the network management entity transmitting towards the serving entity a response message acknowledging deletion of the bearer connection of the UE, wherein
   the UE Context Release Complete message comprises information regarding data usage.

12. The method of claim 11, wherein the detach message is transmitted by the network management entity towards the user equipment via the network entity.

13. The method of claim 12, wherein the network entity is an E-UTRAN Node B.

14. The method of any one of claim 11, wherein the detach accept message is transmitted by the user equipment to the network management entity via the network entity.

15. The method of claim 11, wherein the response message comprises the information regarding data usage.

16. The method of claim 11, wherein the network management entity is a Mobility Management Entity (MME).

17. The method of claim 11, wherein the serving entity is a Serving Gateway.

18. The method of any one of claim 11, wherein the network entity to which the network management entity is configured to transmit the UE Context Release Command message towards and/or receive the complete message from is an E-UTRAN Node B.

19. The method of claim 11, wherein the information regarding data usage comprises a Secondary RAT Usage Data Report.

20. The method of claim 11, wherein the information regarding data usage relates to data usage over a Secondary Radio Access Technology communications network.

21. The method of claim 11, wherein the information regarding data usage relates to data usage of a New Radio communications network or data usage over an unlicensed spectrum radio communications network.

22. The method of any one of claim 11, wherein
   at least one of the network management entity, the serving entity, or the network entity is provided in a communications network as a virtual machine.

23. The method of claim 11, wherein the request message comprises a dedicated cause-code initiating handover between a 3GPP network to a non-3GPP network.

24. A computer program product comprising a non-transitory computer readable medium storing a computer program comprising computer-executable instructions for enabling a management entity to perform the method of claim 11.

25. A method for bearer deactivation, the method comprising:
 a management entity receiving a request message transmitted by a serving entity, the request message indicating deletion of a bearer connection for a user equipment (UE) being served by a base station;
 in response to receiving the request message, the management entity:
  transmitting towards the UE a detach message;
  after transmitting the detach message towards the UE, receiving from the UE a detach accept message; and
  after receiving the detach message from the UE, transmitting towards the base station a UE Context Release Command message for causing the base station to release a context associated with the UE;
 after transmitting the UE Context Release Command message, the management entity receiving a UE Context Release Complete message transmitted by the base station; and
 in response to receiving the UE Context Release Complete message, the network management entity transmitting towards the serving entity a response message acknowledging deletion of the bearer connection, wherein
 the UE Context Release Complete message comprises information regarding data usage, and the response message comprise the information regarding the data usage.

26. A network management entity in a communications network, the network management comprising:
 a receiver for receiving a request message transmitted by a serving entity, the request message indicating deletion of a bearer connection for a user equipment (UE); and
 processing circuitry configured to cause the network management entity to perform a process in response to the network management entity receiving the request message transmitted by the serving entity, wherein the process comprises:
  transmitting a detach message towards the UE;
  after transmitting the detach message towards the UE, receiving a detach accept message transmitted by the UE;
  after receiving the detach accept message transmitted by the UE, transmitting towards a network entity serving the UE a UE Context Release Command message for causing a network entity serving the UE to release a context associated with the UE; and
  in response to receiving a UE Context Release Complete message transmitted by the network entity serving the UE, transmitting towards the serving entity a response message acknowledging deletion of the bearer connection of the UE, wherein
 the response message acknowledging deletion of the bearer connection of the UE comprises information regarding data usage.

* * * * *